(No Model.)  G. I. & G. JORDA.  3 Sheets—Sheet 1.
ROTARY ENGINE.

No. 511,622.　　　　　　　　　Patented Dec. 26, 1893.

WITNESSES:
J. A. Bergstrom
C. Sedgwick

INVENTORS
G. I. Jorda
BY G. Jorda
Munn & Co
ATTORNEYS.

THE NATIONAL LITHOGRAPHING COMPANY,
WASHINGTON, D. C.

(No Model.) 3 Sheets—Sheet 2.

G. I. & G. JORDA.
ROTARY ENGINE.

No. 511,622. Patented Dec. 26, 1893.

WITNESSES:
J. A. Bergstrom
C. Sedgwick

INVENTORS
G. I. Jorda
G. Jorda
BY Munn & Co.
ATTORNEYS.

(No Model.) 3 Sheets—Sheet 3.

G. I. & G. JORDA.
ROTARY ENGINE.

No. 511,622. Patented Dec. 26, 1893.

WITNESSES:
J. A. Bergstrom
C. Sedgwick

INVENTORS
G. I. Jorda
G. Jorda
BY Munn & Co
ATTORNEYS.

UNITED STATES PATENT OFFICE.

GEORGE I. JORDA AND GOTTLIEB JORDA, OF NEW YORK, N. Y.

ROTARY ENGINE.

SPECIFICATION forming part of Letters Patent No. 511,622, dated December 26, 1893.

Application filed March 25, 1893. Serial No. 467,561. (No model.)

*To all whom it may concern:*

Be it known that we, GEORGE I. JORDA and GOTTLIEB JORDA, of the city, county, and State of New York, have invented a new and Improved Rotary Engine, of which the following is a full, clear, and exact description.

Our invention relates to improvements in rotary steam engines; and the object of our invention is to produce a rotary engine of great simplicity and of cheap construction, which is adapted to utilize to its greatest extent the expansive force of the steam, and which is arranged so that the steam will act continuously to turn the piston.

To this end our invention consists in certain features of construction and combinations of parts, as will be hereinafter described and claimed.

Reference is to be had to the accompanying drawings forming a part of this specification, in which similar figures of reference indicate corresponding parts in all the views.

Figure 1:
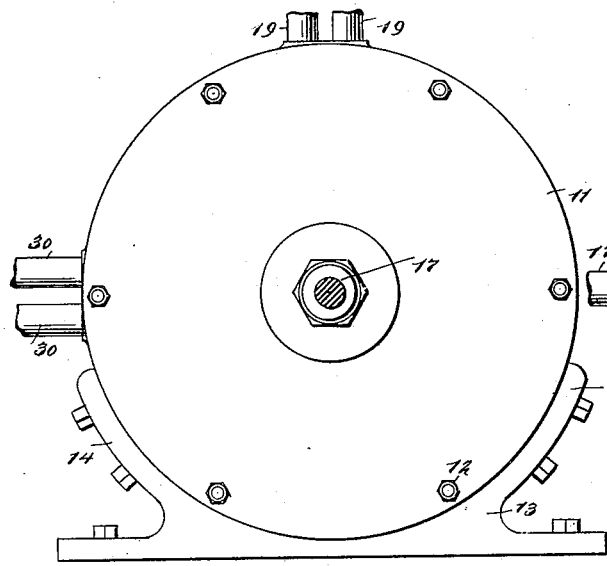
Figure 2:
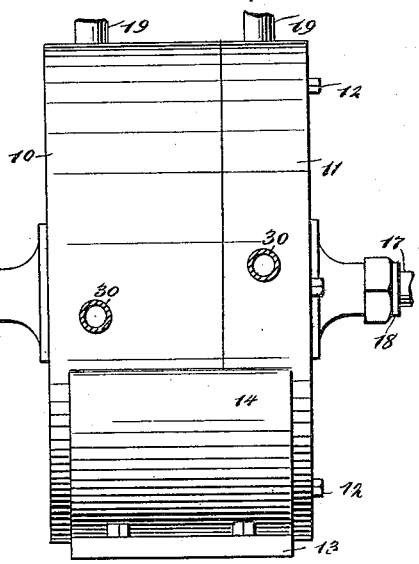
Figure 3:
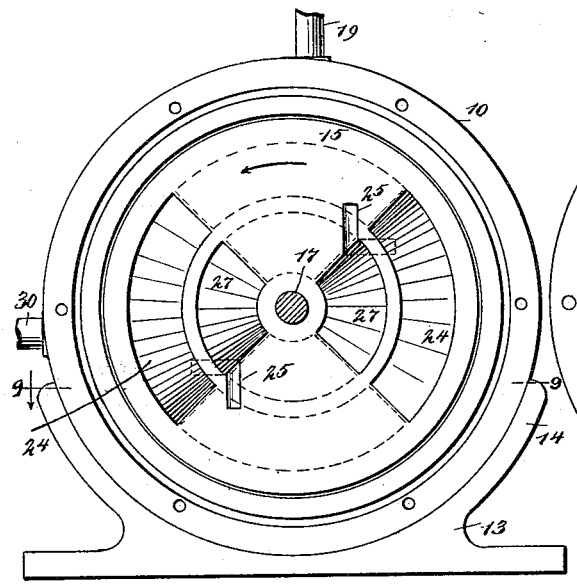
Figure 4:
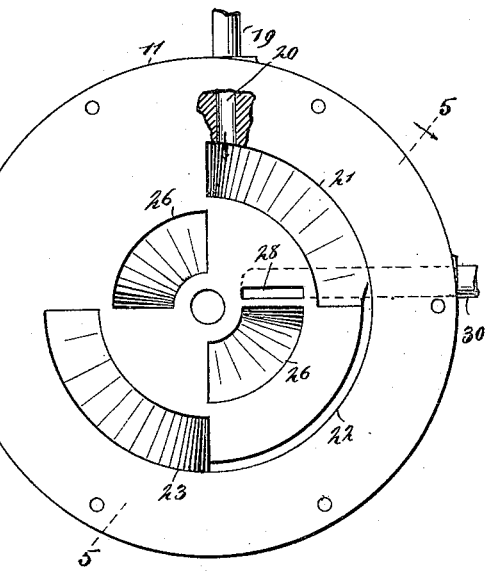
Figure 5:
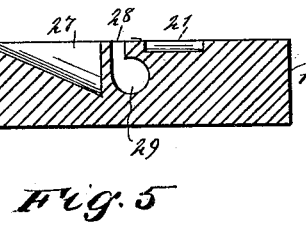
Figure 6:
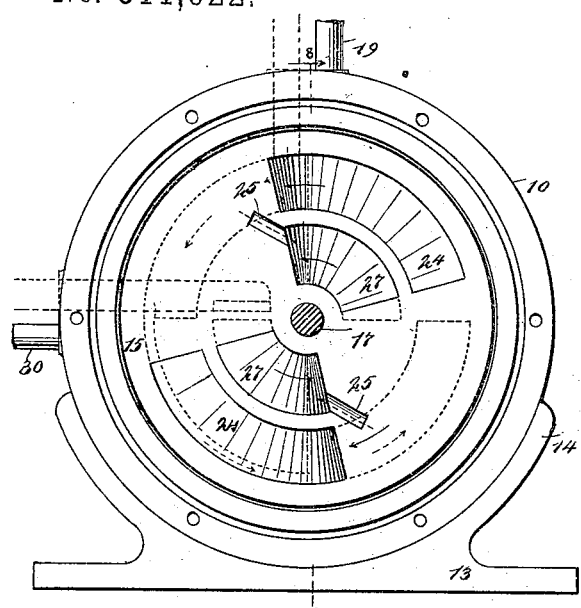
Figure 8:
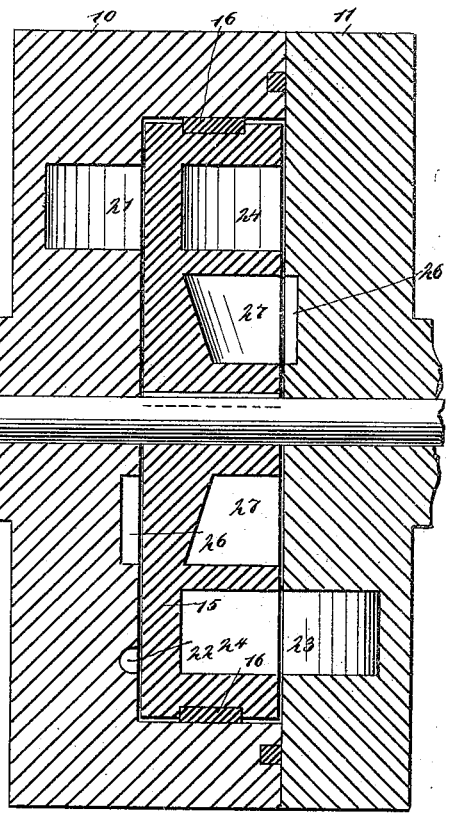
Figure 7:
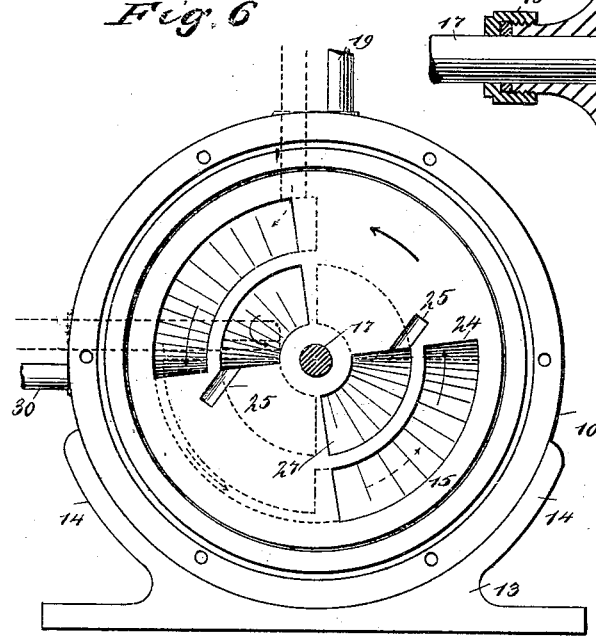
Figure 9:
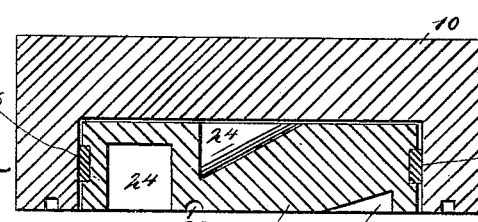
Figure 10:
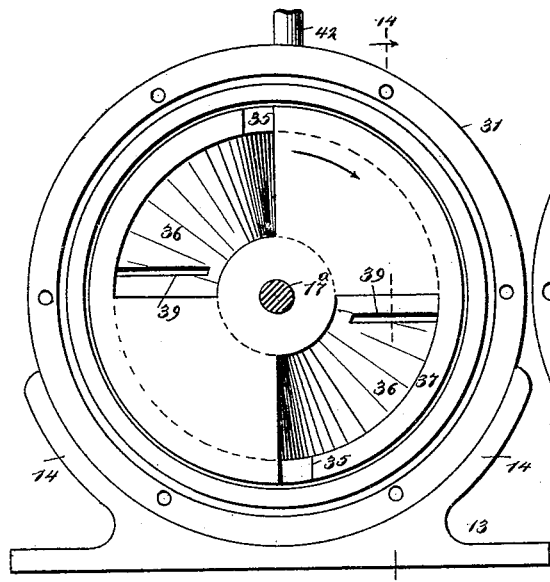
Figure 11:
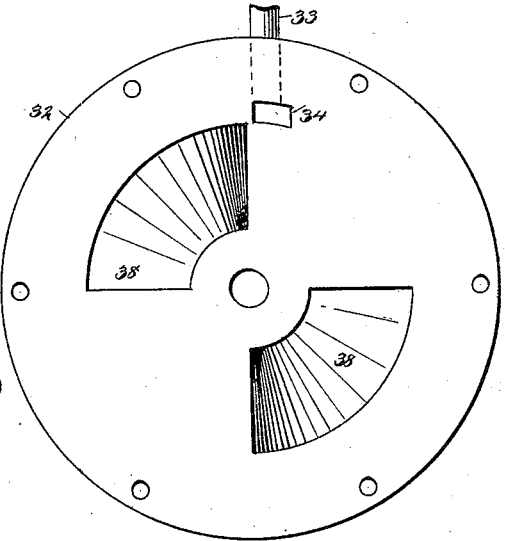
Figure 12:
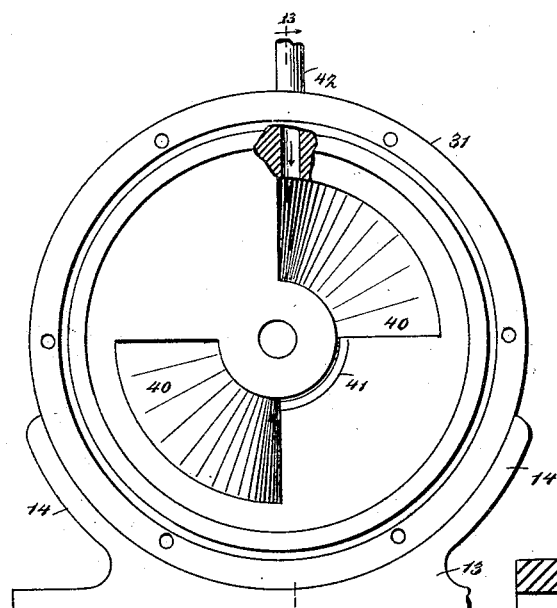
Figure 14:
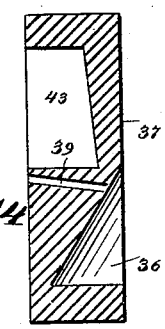
Figure 13:
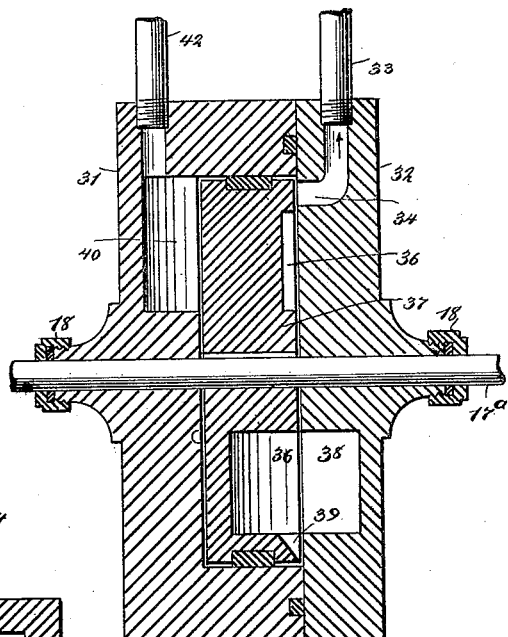

Figure 1 is a side elevation of the engine embodying our invention. Fig. 2 is a front elevation of the same. Fig. 3 is an elevation of the engine with the cover or one side of the cover removed. Fig. 4 is a broken inside elevation of one part of the case, showing the arrangement of steam chambers and ports therein. Fig. 5 is a detail cross section on the line 5—5 in Fig. 4. Fig. 6 is an elevation, similar to that shown in Fig. 3, but with the piston in a different position. Fig. 7 is a similar view to that shown in Figs. 3 and 6, but with the piston in still another position. Fig. 8 is a cross section on the line 8—8 in Fig. 6. Fig. 9 is a cross section on the line 9—9 in Fig. 3. Fig. 10 is an inside elevation of a modified form of the engine which is adapted for use as a marine engine. Fig. 11 is an inside elevation of one part of the case shown in Fig. 10. Fig. 12 is an inside elevation of the opposite portion of the case. Fig. 13 is a cross section on the line 13—13 in Fig. 12; and Fig. 14 is a detail cross section of the piston, the section being taken on the line 14—14 in Fig. 10.

The engine is provided with a stationary case made in two parts 10 and 11, the latter being merely a cover for one end of the case, and these parts are held together by bolts 12 and are provided in their adjacent faces with a suitable packing ring to prevent the escape of steam. The case is preferably of cylindrical shape exteriorly, and must be interiorly; it is supported on a suitable base 13 which has upwardly extending curved flanges 14 to fit the curved sides of the case to which the flanges are securely bolted. Within the case is a rotary piston 15 which turns steam tight in the case, and to this end the piston has in its face a packing ring 16 which fits snugly against the inner face of the case. The piston is secured to a shaft 17 which projects through the ends of the case, being held in suitable packing boxes 18 and from which power may be taken in the usual way.

The engine, as shown, is a duplicate engine; that is, it is provided with similar ports and chambers on each side of the piston, with similar ports and chambers in each end of the case, and with an inlet and exhaust on each side, so that in running the engine either side may be used, but both are not used together. One side only of the engine will be described below, and as the other side is similar, it is needless to describe it.

The engine is provided on each side with an inlet pipe 19 which connects with a port 20 which leads to a curved steam chamber 21 and this connects by means of a channel 22 with a similar chamber 23, these chambers being arranged in diametrically opposite sides of the case and in each end, the chambers having an inclined back wall so that they are deep at one end and shallow at the other. The chambers 21 and 23 are in direct communication, as illustrated in Fig. 4, and their curvature conforms to the curvature of the piston, so that the chambers are adapted to register with similarly shaped chambers 24 in the face of the piston and on diametrically opposite sides thereof. The pitch of the back walls of the chambers 24 is opposite, however, to that of the chambers 21 and 23, and the steam in the chambers 21 and 23, striking the abutment formed by the wall at the deeper ends of the chambers 24, serves to turn the piston in the direction of the arrow in Fig. 3.

In the face of the piston 15, adjacent to the deeper ends of the chambers 24, are channels or ports 25 which are adapted to connect with chambers 26 in the stationary case end and thus convey steam to the said chambers so that it may act on similar chambers 27 in the piston. The chambers 26 and 27 are shaped with relation to each other, exactly like the chambers 21, 23 and 24, and are placed concentric to the outer chambers, and a double set of chambers is thus provided so that the steam will have a double action on the piston. Near the end of one of the chambers 26 in the stationary part of the engine is an exhaust opening 28 leading outward to a port 29 which connects with the exhaust pipe 30. When the steam enters through the pipe 19 and port 20, it fills the chambers 21 and 23 and passing through the channels 25 enters the chambers 26 and 27, where it expands and, acting on the walls at the deeper ends of the chambers 27, causes the piston 15 to start in the direction of the arrow in Fig. 3.

The flat face of the piston will be opposite the exhaust port 28 so as to close it, and as the piston starts the chambers 24 are brought opposite the chambers 21 and 23 so that the steam expands in the chambers 24 and, acting against their walls at their deeper ends, continues to turn the piston in the direction indicated, after which the inner chamber 27 passes opposite the exhaust opening 28 and the steam exhausts through said opening and through the port 29 and pipe 30. It will thus be seen that the steam acts longitudinally in the chambers 27 and 24, so as to be exerting force constantly on the piston and the latter is steadily turned and exhausts every time one of the chambers 27 passes the port 28.

As shown in Figs. 10 to 14, the engine is of a simple form and is therefore better adapted for marine purposes, the engine here shown being a single engine having a pair of steam chambers on each side of its piston. The engine is provided with a case consisting of two parts, 31 and 32, substantially like the parts 10 and 11 already described, except that the chambers and ports are differently arranged, and the case is held in a base similar to the one already referred to. In the part 31 is held the inlet pipe 42 which connects with one of the chambers 40, in the case, which chambers will be described below.

The chambers 40 are of segmental shape, and are arranged in diametrically opposite sides of the case, the chambers having inclined back walls, so that they are deep at one end and shallow at the other, and the two chambers are connected by a channel 41, so that both will be filled with steam at the same time.

The piston 37 which rotates in the case, is provided on one side with chambers 43, which are produced in one face so as to register with the chambers 40 in the part 31 of the case, and these chambers are shaped like the chambers 40, except that they have opposite inclinations, and the steam which expands in the chambers 40 and 43, acts on the walls at the deep ends of the latter chambers so as to revolve the piston. On the opposite side of the piston are similar chambers 36, from the shallow ends of which extend ports 39, these leading transversely through the piston so as to connect with the chambers 40 and provide for the exhaust as described below.

The chambers 36 are adapted to register with the chambers 38 in the part 32, which chambers are like the chambers 40 already described, and which enable the steam to expand so as to act on the wide end walls of the chambers 36, and assist in propelling the piston. Opening radially outward from the deeper ends of the chambers 36 are ports 35, which are adapted to register with the side port 34 in the end 32 of the case, and this port connects with an exhaust pipe 33. The steam then will enter the pipe 42, and expanding in the chambers 40 and 43, will propel the piston, and as the ports 39 come opposite the chambers 40, the expanded steam will pass out through the ports to the chambers 36 and 38, and when the ports 35 of the chambers 36 come opposite the chambers 38, the engine will exhaust.

Having thus described our invention, we claim as new and desire to secure by Letters Patent—

1. A rotary engine, comprising a stationary case having steam chambers in its end walls, the chambers having inclined back walls, a steam inlet for one chamber, a rotary piston held to turn in the case and having chambers to register with the case chambers, the piston chambers being also provided with inclined back walls, the piston being provided with a peripheral groove containing packing bearing against the circular interior of the case and a suitable exhaust for the engine, substantially as described.

2. A rotary engine, comprising an inclosing case, a revoluble piston held to turn in the case and provided with a suitable driving shaft, connected chambers in an end wall of the case, the chambers having their back walls inclined from one end to the other, a second set of chambers parallel with the first chambers, parallel sets of chambers produced in the piston and adapted to register with the chambers in the case, channels 25 in the face of the piston connecting with the inner chambers thereof, and adapted at their outer ends to connect with the end wall chambers a steam inlet connecting with one of the outer case chambers, and an exhaust port 28 in the end of the case adjacent to the deep end of one of its inner chambers adapted to register with the inner piston chambers, substantially as described.

3. A rotary engine, comprising a two-part case, a revoluble piston held to turn in the case, a support for the case, parallel curved steam chambers produced in the end of the case and on opposite sides of its center, the outer chambers being connected by a steam channel 22, said channel leading from the shallow end of one of said outer chambers to the deep end of the other chamber, a steam inlet connected with one of the outer chambers, curved parallel steam chambers in the piston adapted to register with the chambers in the case, the piston chambers being deep at one end and shallow at the other, channels 25 in the face of the piston, the channels connecting with the inner piston, chambers at an angle thereto and adapted to register with the outer case chambers, and an exhaust port 28 in the case adjacent to the deep end of one of its inner chambers 26 and adapted to register with the inner piston chambers, substantially as described.

GEORGE I. JORDA.
GOTTLIEB JORDA.

Witnesses:
WM. STAUFF,
JOSEF RUZIEKA.